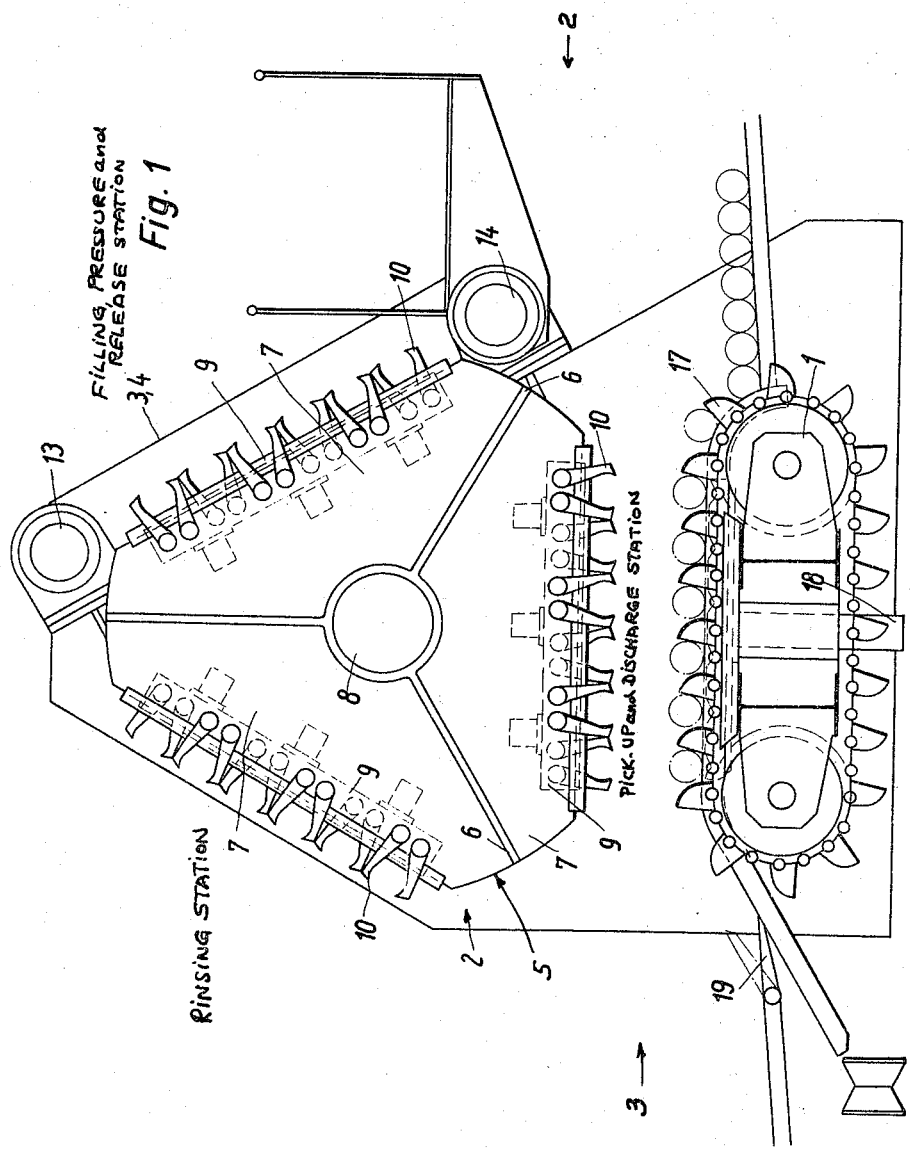

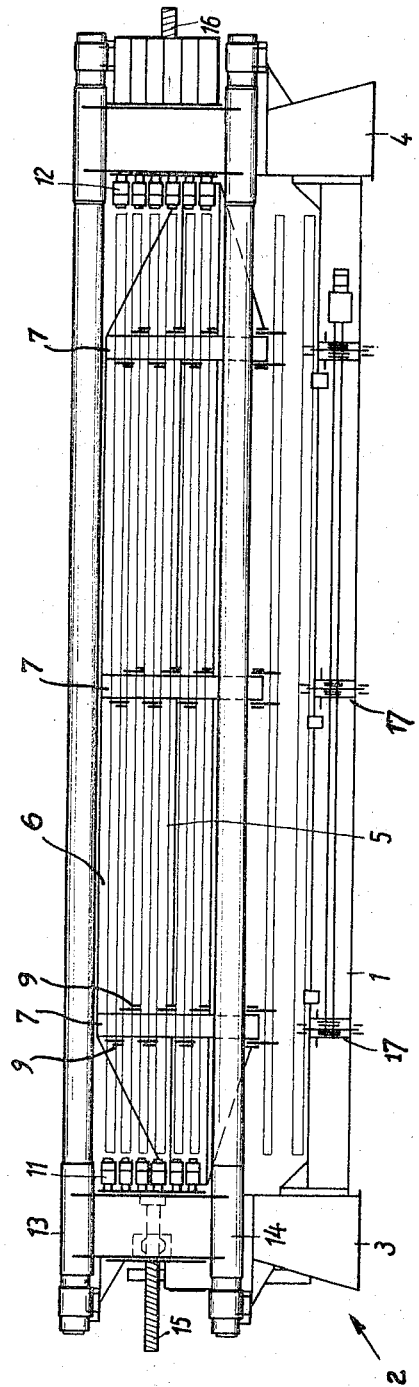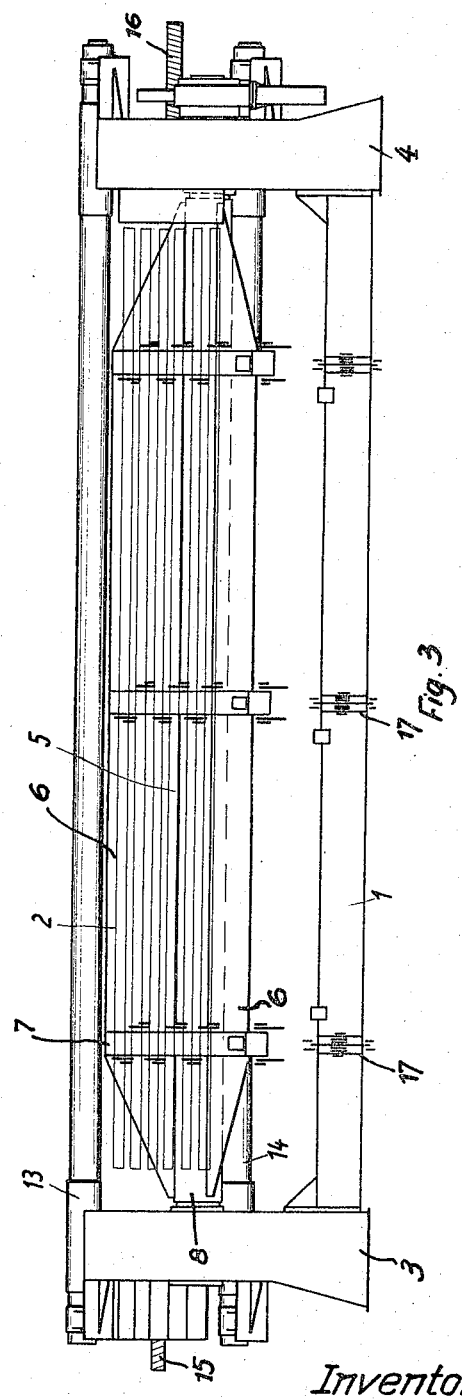

3,312,356
CONVEYOR FOR MULTIPLE TUBE TEST PRESS
Richard Gerretz, Suchteln, and Werner Lehnacker, Rheydt, Germany, assignors to Mannesmann-Meer Aktiengesellschaft, a corporation of Germany
Filed Feb. 8, 1965, Ser. No. 431,108
3 Claims. (Cl. 214—1)

The invention relates to testing presses for testing hollow tubes, and relates more particularly to multiple tube testing presses.

The tube testing presses of the prior are in part operate in a horizontal plane with successive operating stations arranged in series, and in part operate in a circular arrangement. Both possibilities have drawbacks that have repercussions in the economics and investment fields. Thus, machines of the horizontal type need considerable working space and render close observation difficult.

In order to avoid this drawback, so-called drum-type testing presses were developed, of which single and multiple types are available on the market. Although the question of space was solved favorably here, an increase in production, however, is hardly possible with these known constructions except if it be gained by shortening the testing time which, indeed, can never be long enough. Furthermore, the costly need of additional investment required for testing heads and revolving connections for hydraulic conduits and connectors should not be overlooked.

Aside from the difficulty to observe the testing operation which is arranged mostly in rotation and assigned to a circular path, it is a special disadvantage that the test tubes move under pressure, so that the concentration of the observer, on account of the physical strain of the eyes accompanied by head movements, slackens soon and gives way to tiredness.

Even a single test press with so-called revolving drums which has recently become known, does not solve the problem of timing, nor of the disturbance of the continuous flow of the operation, although four different operations are carried out simultaneously in a known fashion. On the contrary, it is a step back compared to multiple test machines with horizontal operation, as in the single press the testing time is too limited. Usually, the length of the testing time is a measure for the value of the testing procedure, as examination by pressurized water in such a short time cannot point out reliably the finest hairline defects of porous areas.

Regarding costs, it must be pointed out that, although the aforesaid single test press with revolving drums involves but a single machine, with four operating stations, there are needed four rotating test heads and other additional sealings.

It is accordingly among the principal objects of the invention to provide a testing press which fills all demands as to space, investment economics and operational continuity, wherein the testing time and the possibility to observe the testing are of primary importance.

It is a further object of the invention to provide such a testing press which permits the testing of all the tubes emerging from a tube manufacturing machine with a very high production quota.

It is a still further object of the invention to provide a machine which not only enables improvements as to space, but also guarantees that the parts to be tested for a long time under pressure are not exposed to any movement, and do not hinder the continuity of flow of operation, whereby the whole structure is carried out without special additional effort and admits of further improvements of operation.

Further objects and advantages of the invention will be set forth in part in the following specification and in part will be obvious therefrom without being specifically referred to, the same being realized and attained as pointed out in the claims hereof.

Reference is had to German Patent No. 1,032,497, to German Patent No. 1,032,944, and to German (utility model) No. 1,868,497.

For a fuller understanding of the nature and objects of the invention, reference should be had to the following detailed description, taken in connection with the accompanying drawings, in which:

FIG. 1 is a vertical end elevational view of a testing press in accordance with the instant invention;

FIG. 2 is a front elevational view, as seen in the direction of the arrow 2 of FIG. 1; and FIG. 3 is a rear elevational view, as seen in the direction of the arrow 3 of FIG. 1.

Assuming that in the known horizontal multiple test presses the working plane for the successive operating stations for the pick-up, the rinsing, the filling- pressurizing-and-releasing, and the discharging, takes place along the sides of a prism, the invention follows a reverse train of thought, and reduces the operation to take place at three stations, namely a combined pick-up and discharge station, a filling-pressure-release station, and a rinsing station, all as indicated in FIG. 1; this permits to operate with only three operating stations for a six-fold testing press along the sides of a triangular prism; thereby the operating stations of receiving and depositing tubes and tube filling-testing-delivering are purposely reduced to one operating station each, so that only for rinsing the tube a third operating station is needed.

All the working operations are carried out at only three stations simultaneously, whereby there will be available the time necessary for the rhythm of the revolutions of the prism as the work continuity of the tube production machine demands, namely the number of tubes in a given time.

The instant testing press permits the saving of so much time that aside from the above described operating stations further additional testing stations could be built in, for instance based on physical principles, wherein the number of sides of the prism changes accordingly.

As shown in FIGS. 1–3, the test press arrangement comprises by way of example a delivery device 1 and the multiple test press 2 itself mounted over it.

The multiple test press 2 comprises two bearing supports 3, 4 and a rotatable triangular prism, the cross section of which is formed as a triangular star 5; the radial axes of said triangular rotary star 5 are formed by three webs 6 which are radially off-set from each other for 120°; the webs 6 are stiffened by radial metal sheets 7, and are mounted for rotation on a central tube 8. These radial metal sheets 7, as shown in FIGS. 2 and 3, are lengthwise evenly distributed and each has at its free side a magazine 9. The magazine 9 serves to receive movable holding tongs 10, which are adapted to pick up and to discharge a plurality of, for example, six tubes. The tongs 10 are operated by well-known conventional operating means (not shown). The connecting lines that may be drawn through the center points of the individual tongs 10 form in a radial plane, at right angle to the tube axes, an isosceles triangle.

At equal height and in the same direction, the two bearing supports 3, 4 are provided with oppositely facing test heads 11, 12; the center axes of the test heads 11, 12 are parallel to the connecting line of the center points of the tongs 10; in the instant exemplification, there are provided six pairs of test heads 11, 12.

As an aid in taking up the pressure, the bearing supports 3, 4 are interconnected by two tension rods 13, 14 which are also mounted at the height and in the direction of the center axes of the test heads and thus are outside the axis of rotation of the rotary star 5.

During operation, the star 5 will be turned step-wise clockwise (FIG. 1). Following the step-wise rotary shift movement of the star 5, one corner of the isosceles triangle thereof will point vertically upwardly, and the test heads 11, 12 with the tension rods 13, 14 will be on the right hand side (FIG. 1).

The three operating stations will be so distributed, as labeled, that the pick-up and discharge station of the tubes will be under the point of the triangle, the rinsing station will be on the left thereof and the filling, pressure and release station to the right thereof.

The position of the test heads 11, 12, by means of well-known spindles 15, 16, can be adjusted to correspond to the length of the tubes to be tested. For example, by means of conventional suitable hydraulic means (not shown) each test head may be moved to a testing position adjacent the end of a tube to be tested; in this manner, any difference in length, of the tubes to be tested simultaneously, may be compensated.

As illustrated in FIG. 1, the delivery device 1, by means of a bucket chain 17 which corresponds in its sections to the distances of the tube holding tongs 10, receives test tubes which are fed to the device 1 on a rolling chute; thereafter, these tubes are fed to the tube holding tongs 10 by means of a movable hydraulically operated lifting device 18.

There is also provided a selecting tilting lever 19. It serves to convey the tested tubes in one and any rejected tube in another direction. It is activated by a control device at the control table where the location of the rejected tube is recorded during testing.

The operation of the machine is as follows:

Six tubes reach the bucket chain 17 over a rolling chute. Above the delivery device 1 the tong magazine 9 is in horizontal position and is empty. The lifting device 18 turns the tubes over to the magazine 9 where they are held by the movable tongs 10.

About a step-wise switching device (not shown) the star 5 is then turned clockwise (FIG. 1) for 120°. In the position of the star after this first shift for one-third of a full rotation, the delivery device 1 has received six more tubes, so that the tubes already lying in readiness are fed to the next empty magazine 9. Simultaneously, however, after the first shift, the previously loaded magazine 9 has subjected its tubes to a rinsing operation.

Thereafter, the start 5 is shifted again for another one-third of a full revolution. Meanwhile the lever 18 was loaded again and feeds its tubes to the magazine 9 above; the tubes already rinsed are filled and examined at the next station and the previous magazine has again offered its tubes for rinsing, so that three functions are here carried out simultaneously.

Now the delivery device 1 must be, empty, in readiness for the next shift of the start 5 for one-third of a full revolution in order to take the tested tubes and pass them on. During this passing-on, new tubes are successively received by means of the bucket chain 17, so that from now on the cycle proceeds continually in a pace prescribed by the successive steps. Thus all operations are carried out simultaneously.

We wish it to be understood that we do not desire to be limited to the exact details of construction shown and described, for obvious modifications will occur to a preson skilled in the art.

Having thus described the invention, what we claim as new and desire to be secured by Letters Patent, is as follows:

1. In a multiple tube test press, in combination, a plurality of operating stations disposed in series sequence operable to subject several tubes simultaneously to treatment, rotatable means actuatable for receiving said tubes in one station before testing and discharging them after testing, and for transporting said tubes in step-wise turning movement, placing them at each step in an operating station, the succeeding operation stations having the same length and being so inclined in relation to each other that they define substantially an extended prism with equal sides, said rotatable means conforming to said prism and comprising near each side a magazine including tube tongs operable for releasably holding said tubes, the axis of rotation lying in the prismatic center.

2. In a multiple tube testing press, according to claim 1, the reception and discharge of the tested tubes taking place at one single station, and a delivery device disposed below said press and operable for delivering new tubes to said one station and to discharge the tubes therefrom after testing.

3. In a multiple tube testing press, as claimed in claim 2, said delivery device being so arranged below the testing press that the vertical symmetrical axis of the cross section of the delivery device points to the center of the axis of rotation of the testing press.

References Cited by the Examiner
UNITED STATES PATENTS

| | | | |
|---|---|---|---|
| 2,617,292 | 11/1952 | Grau | 73—45 |
| 2,679,748 | 6/1954 | Kent et al. | |
| 2,765,076 | 10/1956 | Casler et al. | 209—88 |
| 2,959,955 | 11/1960 | Pasquale. | |

FOREIGN PATENTS

| | | |
|---|---|---|
| 1,165,307 | 3/1964 | Germany. |
| 401,621 | 11/1933 | Great Britain. |

M. HENSON WOOD, JR., *Primary Examiner.*

ALLEN W. KNOWLES, *Examiner.*